United States Patent
Tracht

(10) Patent No.: US 7,401,806 B2
(45) Date of Patent: *Jul. 22, 2008

(54) VEHICLE SEAT SIDE AIR BAG GUIDE

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/687,323

(22) Filed: Mar. 16, 2007

(65) Prior Publication Data

US 2007/0222191 A1   Sep. 27, 2007

(30) Foreign Application Priority Data

Mar. 23, 2006  (DE) .................. 10 2006 013 486

(51) Int. Cl.
*B60R 21/207* (2006.01)
(52) U.S. Cl. .................. 280/730.2; 280/728.3
(58) Field of Classification Search ............. 280/728.2, 280/728.3, 730.2; 297/216.1, 216.13
See application file for complete search history.

(56) References Cited

U.S. PATENT DOCUMENTS 5,498,030 A * 3/1996 Hill et al. ............... 280/743.1
5,893,579 A * 4/1999 Kimura et al. ........... 280/730.2
5,988,674 A * 11/1999 Kimura et al. ........... 280/730.2
6,045,151 A * 4/2000 Wu ......................... 280/728.3
6,074,003 A * 6/2000 Umezawa et al. ......... 297/216.1
7,290,794 B2 * 11/2007 Tracht ..................... 280/730.2

FOREIGN PATENT DOCUMENTS

GB   2 420 757 A   6/2006
GB   2 420 763 A   6/2006

* cited by examiner

*Primary Examiner*—Christopher Ellis
*Assistant Examiner*—Joseph Rocca
(74) *Attorney, Agent, or Firm*—Brooks Kushman P.C.

(57) ABSTRACT

A vehicle seat component includes a side air bag module mounted on a frame within a trim cover that also covers a seat pad. An air bag guide includes flexible inner and outer panels that extend between a release seam of the trim cover and the air bag module to provide a guiding function to an air bag thereof as it is inflated upon deployment so as to project outwardly through the release seam for use. Inner extremities of the flexible inner and outer panels are respectively secured by a first connector to the seat frame and by a second connector to the trim cover in a spaced relationship from each other, and a connection secures the trim cover to the seat component.

10 Claims, 3 Drawing Sheets

VEHICLE SEAT SIDE AIR BAG GUIDE

CROSS-REFERENCE TO RELATED APPLICATIONS

This application claims foreign priority benefits under 35 U.S.C. §119(a)-(d) to DE 10 2006 013 486.9, filed Mar. 23, 2006, which is hereby incorporated by reference in its entirety.

BACKGROUND OF THE INVENTION

1. Field of the Invention

This invention relates to a vehicle seat component side air bag module including an air bag guide with flexible inner and outer panels having inner extremities respectively secured to the seat component.

2. Background Art

Vehicle seat components have previously included side air bag modules and conventionally include trim covers that have an air bag release seam through which an air bag upon deployment is projected outwardly from within the seat to provide occupant protection. See, for example, U.S. Pat. No. 5,816,610 Higashiura et al.; U.S. Pat. No. 5,860,673 Hasegawa et al.; and U.S. Pat. No. 5,938,232 Kalandek et al. Different constructions have been utilized to permit passage of the air bag past foam seat padding when inflated by an inflator for movement from within the pad outwardly through the trim cover release seam. For example, U.S. Pat. No. 6,045,151 Wu discloses a seat pad having a slot through which the air bag moves from an air bag module to the release seam and also discloses a cloth sleeve that extends entirely about the associated air bag module and to the release seam. Also, U.S. Pat. No. 6,237,934 Harrell et al. and U.S. Pat. No. 6,588,838 Dick, Jr. et al., both of which are assigned to the assignee of the present invention, disclose air bag modules wherein the air bag module is located closely adjacent to the release seam to facilitate the air bag deployment.

SUMMARY OF THE INVENTION

An object of the present invention is to provide an improved vehicle seat side air bag module for providing seat occupant protection.

A vehicle seat component constructed in accordance with the invention includes a frame for mounting on an associated vehicle on which the vehicle seat component is to be used. The frame has a lateral side frame member, and a seat pad is mounted by the frame and has a side extremity adjacent the lateral side frame member of the frame. A trim cover extends over the seat pad and has an air bag release seam adjacent the lateral side frame member and the adjacent side extremity of the seat pad. An air bag module is mounted on the lateral side frame member within the trim cover in a spaced relationship from its air bag release seam, and the air bag module includes an inflator and an air bag that is inflated by the inflator to project outwardly from the seat component through the air bag release seam of the trim cover. An air bag guide includes an inner panel and an outer panel that are each made of flexible material and have outer and inner extremities with their outer extremities connected to the trim cover adjacent the air bag release seam. The flexible inner and outer panels extend alongside each other from their outer extremities to the air bag module and thence respectively inwardly and outwardly of the air bag module. A first connector secures the inner extremity of the flexible inner panel to the frame, and a second connector secures the inner extremity of the flexible outer panel to the trim cover adjacent the air bag module at a spaced location from the first connector. A connection secures the trim cover to the frame.

In one embodiment, the trim cover includes the same type of material extending over the seat pad and from the second connector to the inner extremity of the flexible outer panel to the connection to the frame.

In another embodiment, the trim cover includes an extender of another type of material extending from the connection to the frame to adjacent the second connector of the trim cover to the inner extremity of the flexible outer panel. This embodiment includes stitching for securing the trim cover extender to the rest of the trim cover.

Different ways are disclosed providing the second connector that secures the inner extremity of the flexible outer panel to the trim cover, including stitching, and including a bonded connection that may be an adhesive connection, a heated connection or a solvent connection. The second connector for securing the inner extremity of the flexible outer panel to the trim cover may include stitching and also include a bonded connection.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
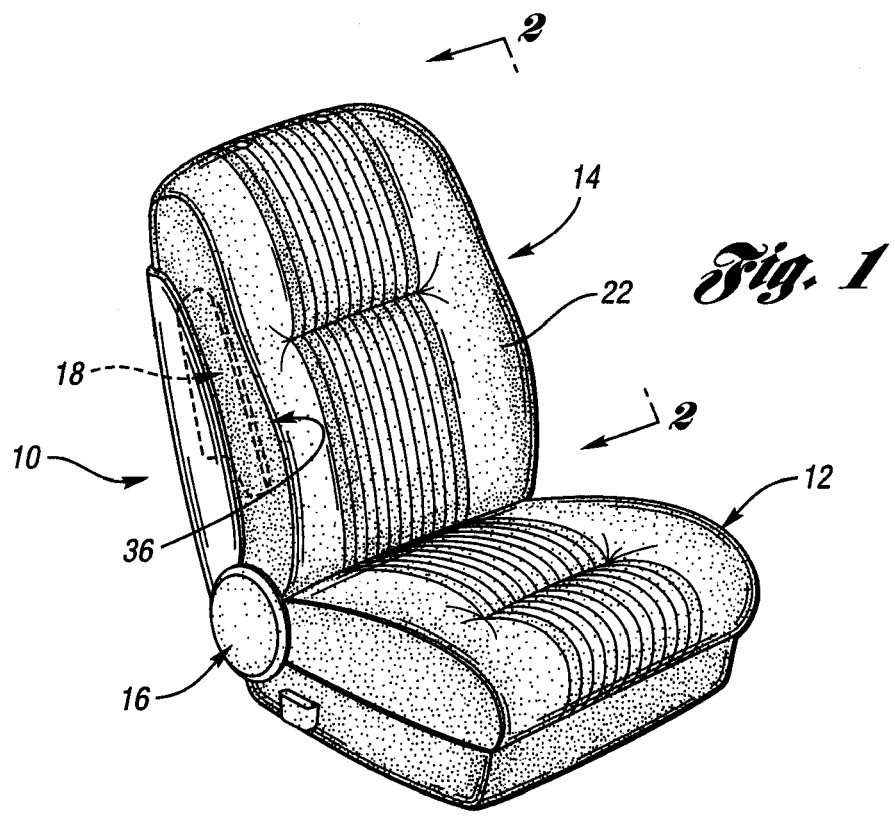
FIG. 1 is a perspective view of a vehicle seat including a seat back component constructed in accordance with the invention to include a side air bag module that is shown by hidden line illustration.
Figure 2:
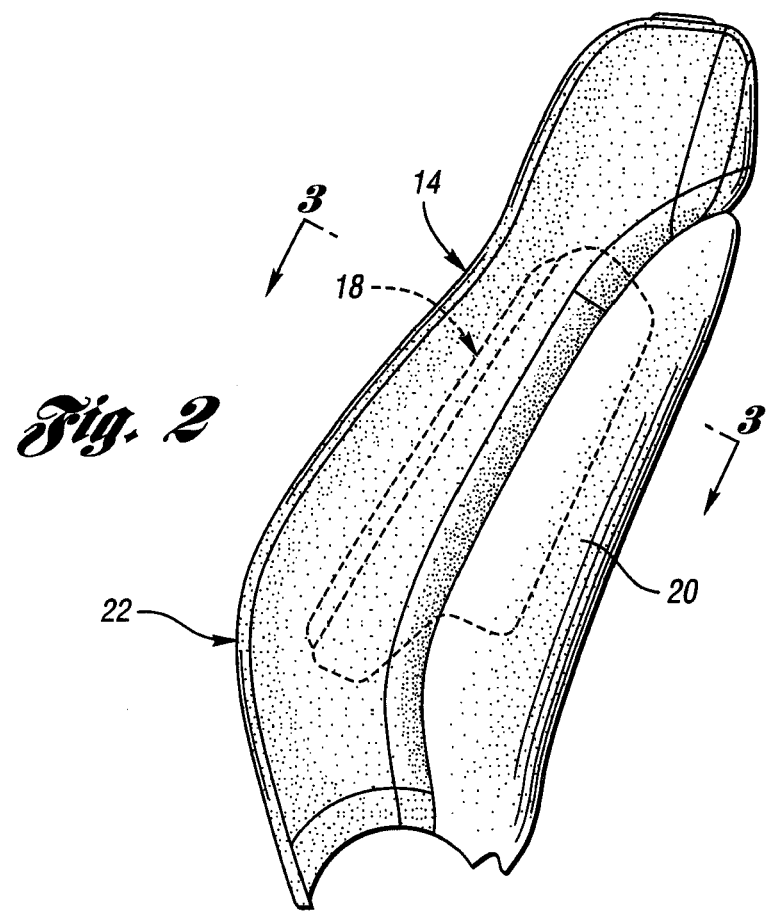
FIG. 2 is a side elevational view of the vehicle seat back component taken along the direction of line 2-2 in FIG. 1 with the side air bag module thereof also illustrated by hidden line representation.

With reference to FIG. 1 of the drawings, a vehicle seat generally indicated by 10 includes a seat bottom 12 for mounting on a vehicle floor and a seat back 14 mounted in a generally upstanding manner on the seat bottom with its angular position controlled in a conventional manner by a recliner generally indicated by 16. The seat back component 14 includes a side air bag module 18 that is constructed in accordance with the present invention as it is hereinafter more fully described and operable to provide seat occupant protection. While the side air bag module 18 is shown on the seat back 14, which is a usage for which it has particular utility, it is also possible for the side air bag module to be utilized with a seat bottom 12 even though the seat back usage is specifically disclosed. Also, as illustrated, the side air bag module 18 is located at an outboard lateral side or extremity of the seat to provide protection against adjacent vehicle structure, but it is also possible to have the side air bag module located at the inboard lateral side to provide protection against an adjacent vehicle occupant and to also have side air bag modules at both outboard and inboard locations for protection in both lateral directions. As shown in FIG. 2, the seat back 14 includes a back panel 20 that may be molded from plastic or pressed wood-chip resin. The seat back 14 also includes a front cushion 22 against which the seat occupant leans to provide back support and in which the side air bag module 18 is located.

Figures 3, 3A:
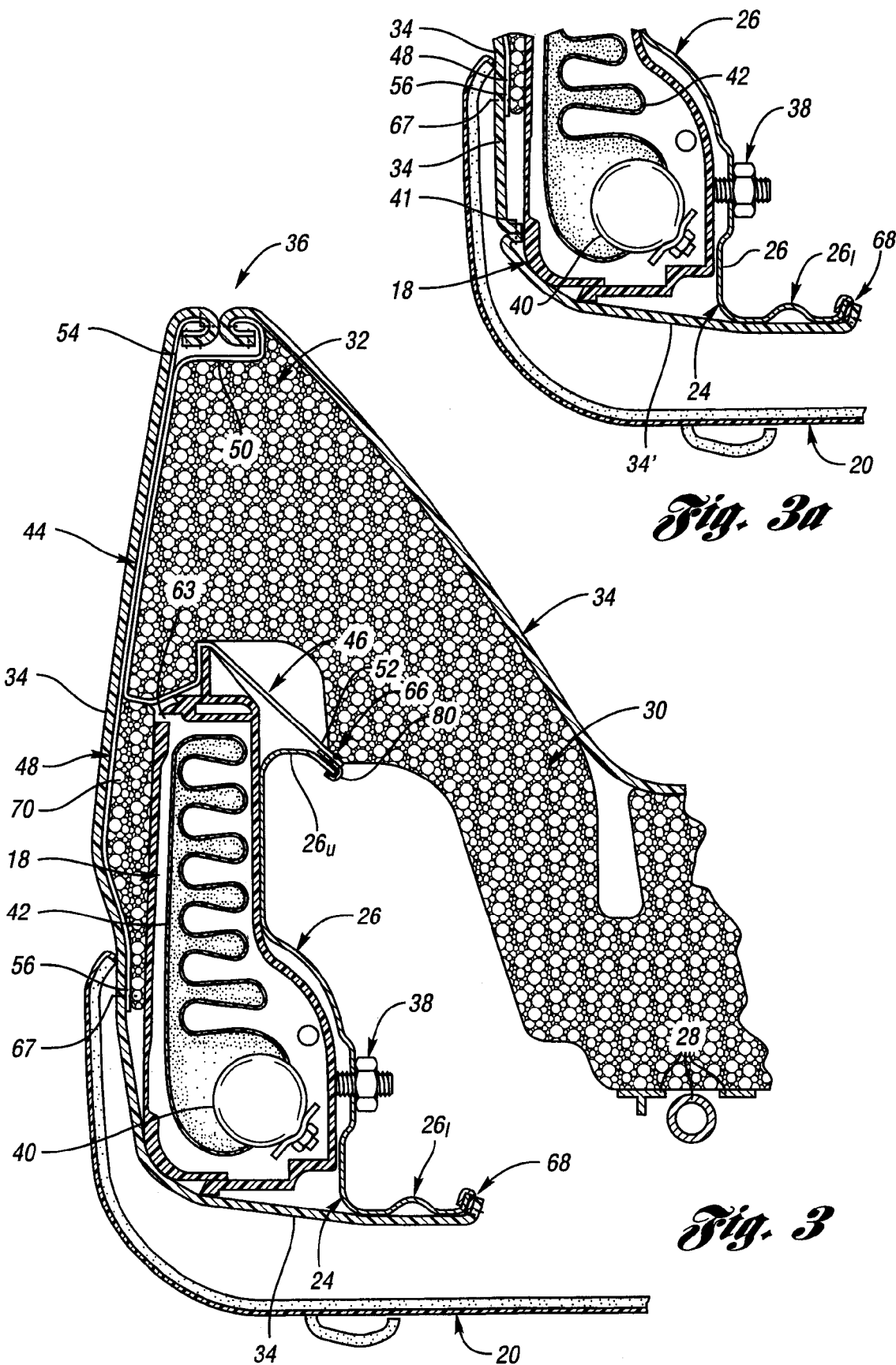
FIG. 3 is a partial sectional view taken through the seat back component along the direction of line 3-3 in FIG. 2 to further illustrate the construction of the side air bag module within the seat back component.
FIG. 3a is a partial view illustrating a modification of a trim cover which includes an extender for attachment to a frame of the seat back component.

As shown in FIG. 3, the seat back component 14 includes a frame collectively identified by 24 and having a pair of formed sheet metal lateral side frame members 26 (only one shown) at its opposite lateral sides as well as having frame tubes and other components all of which are identified by 28. A foam seat pad 30 is mounted on the frame 24 in any conventional manner and has a side extremity 32 adjacent the illustrated side frame member 26. A trim cover generally indicated by 34 extends over the seat pad 30 and includes an air bag release seam 36 adjacent the left side extremity 32 of the seat pad which, as previously mentioned, corresponds to an outboard location. The side air bag module 18 is located within the trim cover 34 mounted on the frame 24, specifically by a threaded connection 38 on the side frame member 26 adjacent the air bag release seam 36 but in a spaced relationship from the release seam. The air bag module 18 includes an inflator 40 and a schematically illustrated air bag 42 which may be folded or rolled and, upon deployment, the air bag is inflated by the inflator to project outwardly from the seat component through the air bag release seam 36 of the trim cover 34.

The trim cover 34 may be made of cloth, vinyl or leather, etc. In some embodiments, the trim cover 34 within the back panel 20 is a continuation of the same type of material as the rest of the trim cover that extends over the foam seat pad 30 as shown in FIG. 3. In other embodiments as shown in FIG. 3a, the trim cover under the back panel includes an extender 34' (FIG. 3a) which may be secured thereto by stitching 41 for securement to the seat component structure as is hereinafter described. Such trim cover extenders can be made of any sufficiently strong and flexible material and can reduce the total cost of the trim cover without losing any aesthetic appeal since the back panel 20 hides the trim cover extension.

With continuing reference to FIG. 3, an air bag guide of the seat back component is generally indicated by 44 and includes an inner panel 46 and an outer panel 48 that are each made of a flexible material such as a suitable cloth. The flexible inner panel 46 has an outer extremity 50 adjacent the air bag release seam 36 and also has an inner extremity 52 as is hereinafter more fully described. The flexible outer panel 48 has an outer extremity 54 adjacent the air bag release seam 36 and has an inner extremity 56 which is hereinafter more fully described.

Figure 4:
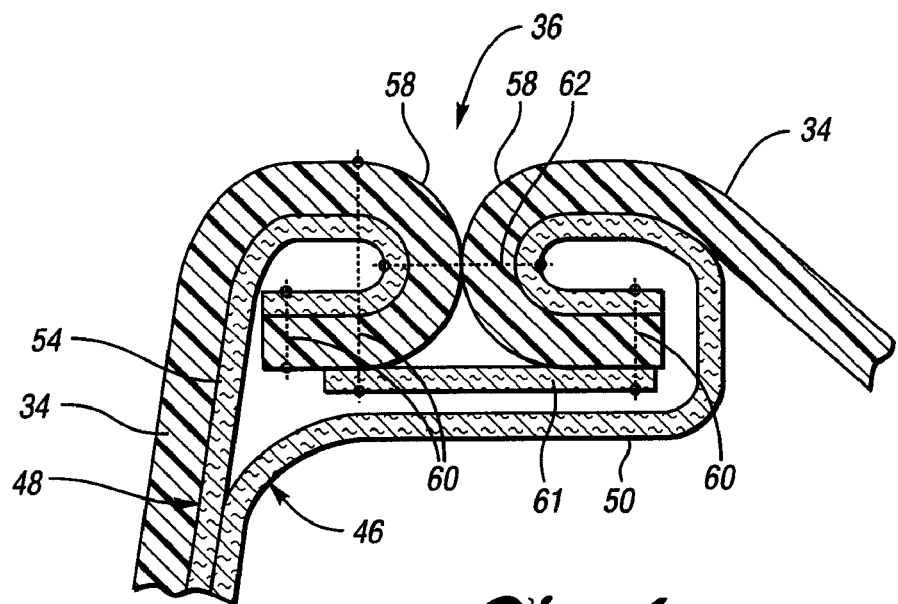
FIG. 4 is an enlarged view of a portion of FIG. 3 illustrating an air bag release seam of a trim cover of the seat back component.

As shown in FIG. 4, the air bag release seam 36 includes bent seam ends 58 of the trim cover 34 and the outer extremities 50 and 54 of the flexible inner and outer panels 46 and 48. Stitching 60 provides securement of the flexible panel outer extremities 50 and 54 to the trim cover 34 and to a release seam backing strip 61, and stitching 62 provides securement of the bent ends 58 to each other.

From the air bag release seam 36 illustrated in FIG. 4, the flexible inner and outer panels 46 and 48 extend alongside each other as shown in FIG. 3 from their outer extremities 50 and 54 to the side air bag module 18 and thence inwardly and outwardly thereof for connection within the seat back component as is hereinafter more fully described. Upon deployment of the side air bag module 18, the air bag 42 moves through a module opening 63 and thence between the flexible inner and outer panels 46 and 48 which then provide a guiding function of the air bag 42 as it moves between the panels toward the air bag release seam 36 and eventually tears open the release seam for outward projection of the air bag to provide the occupant protection. The inner and outer flexible panels 46 and 48 may be made of any suitable flexible material effective to guide the air bag 42 from the module to the release seam. For example, a woven or non-woven cloth material, which may include natural materials or a synthetic material. Materials that are found to be effective are polyamide resins of the types from which the air bag 42 are manufactured. Regardless of the type of material used to make the air bag guide 44, the use of the air bag guide can be helpful in reducing friction on the air bag 42 as it is deployed. Although polymeric resins are particularly beneficial, even a fleece material will help reduce the friction on the air bag 42 because the air bag guide 44 prevents contact between the deploying air bag 42 and the seat pad 30. The air bag guide inner and outer panels 46 and 48 carry the force exerted by the air bag as it moves outwardly toward the release seam 36 so the foam seat pad and trim cover do not have to carry that force and can be designed without such requirement.

As shown in FIG. 3, the formed sheet metal side frame member 26 has one extremity $26_u$, and another extremity $26_l$ spaced from the one extremity. A first connector 66 connects the inner extremity 52 of the air bag flexible inner panel 46 to the frame 24, specifically to the one extremity $26_u$ of the side frame member 26, so as to secure the inner panel during deployment of the air bag as it is inflated by the inflator and guided by the air bag guide previously described. The inner extremity 56 of the flexible outer panel 48 terminates adjacent the air bag module 18 and has a second connector 67 to the trim cover 34, as is hereinafter more fully described, at a spaced location from the first connector 66. A connection 68 secures the trim cover of the trim cover 34 to the frame 24, specifically at the extremity $26_l$ of the side frame member 26.

Securement of the inner extremities 52 and 56 of the flexible inner and outer panels 46 and 48 to the seat component at spaced locations from each other distributes the loading applied by the air bag guide to the seat component during the air bag deployment.

The flexible inner panel 46 as shown in FIG. 3 extends from its outer extremity 50 to the air bag module 18 and thence in a skewed angular relationship from the air bag module to the first connector 66. It should be appreciated that the inner extremity 52 of the flexible inner panel 46 can be secured in other ways to the frame such as by extending between the air bag module 18 and the frame member 26 and having a hole through which the threaded connection 38 extends or by any other type of suitable securement to the seat frame. Furthermore, the flexible outer panel 48 extends from its outer extremity 54 to the air bag module 18 and terminates just past the second connector 67 to the trim cover 34.

With continuing reference to FIG. 3, the flexible outer panel 48 and the trim cover 34 extend along the air bag module 18 over a piece of seat pad foam 70 which is an optional component. Furthermore, the trim cover 34 extends around the air bag module to the connection 68 which provides the securement to the frame 24 at the frame member 26 shown. This connection 68 is hook shaped as shown and is secured in any suitable manner to the trim cover as well as being hooked over the frame member extremity $26_l$.

Figure 5:
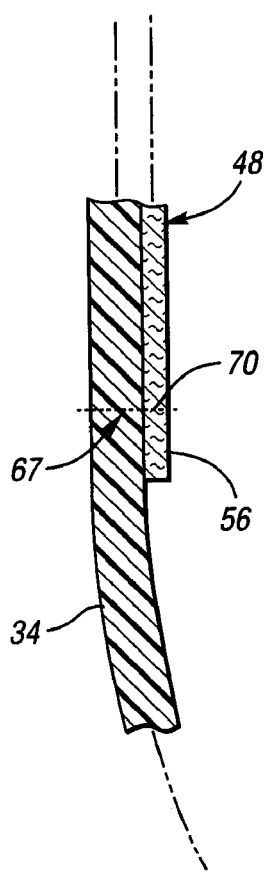
FIG. 5 is a partial view illustrating one embodiment of a connector for securing the inner extremity of a flexible outer panel of an air bag guide to the trim cover of the seat component by stitching.

With reference to FIG. 5, the first connector 66 is also hooked shaped and is secured to the inner extremity 52 of the flexible inner panel 46 in any suitable manner such as by stitching. This first connector is hooked to extremity $26_u$ of the side frame member 26.

While the side air bag module 18 described above has particular utility for use with a vehicle seat back, especially at its outboard location, it is also possible for the side air bag to be utilized with other vehicle seat components such as with a seat bottom.

It should also be appreciated that other types of securement can be used other than the hooked retainers even though such hooked retainers are preferred. For example, rivets, screws, hook and loop, and sharp tang retainers, etc. can be used. Furthermore the stitching disclosed for the release seam 36 and the retainer securement can also be performed by ultrasonic welding, adhesive, etc. Also, while the formed sheet metal lateral side frame member is disclosed, other seat frame members may be used such as tubular seat frames, and aluminum or magnesium die cast frames, etc. It should also be appreciated that the foam portion 70 can be located inwardly of the trim cover 34 in direct contact with the air bag module 18. As previously mentioned, it is also possible for the seat to be constructed without the foam portion 70 in which case the inner extremity of the trim cover will contact the air bag module.

Figure 6:
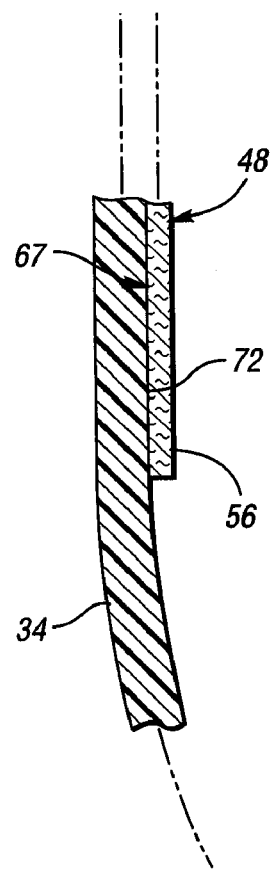
FIG. 6 is another partial view illustrating another embodiment of the connector for securing the inner extremity of the flexible outer panel of the air bag guide to the trim cover by a bonded connection.
Figure 7:
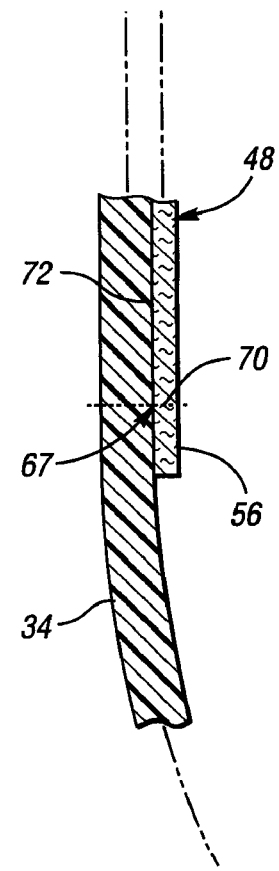
FIG. 7 is a view of another embodiment of the connector for securing the inner extremity of the flexible outer panel of the air bag guide to the trim cover by both stitching and a bonded connection.

FIGS. 5, 6 and 7 illustrate different embodiments of the second connector 67 between the inner extremity 56 of the flexible outer panel 48 and the trim cover 34. More specifically, in FIG. 5, the second connector 67 is provided by stitching 70. In FIG. 6, the second connector 67 between the inner extremity 56 of the flexible outer panel 48 and the trim cover 34 is provided by a bonded connection 72 which may be provided by an adhesive connection, a heated connection, a solvent connection, etc. Furthermore, in the embodiment of FIG. 7, the second connector 67 between the inner extremity 56 of the flexible outer panel 48 and the trim cover 34 is provided by both stitching 70 and a bonded connection 72.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat component comprising:
   a frame for mounting on an associated vehicle on which the vehicle seat component is to be used, and the frame having a lateral side frame member;
   a seat pad mounted by the frame and having a side extremity adjacent the lateral side frame member of the frame;
   a trim cover extending over the seat pad and having an air bag release seam adjacent the side extremity of the seat pad;
   an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;
   an air bag guide including an inner panel and an outer panel that are each made of flexible material and have outer and inner extremities with their outer extremities connected to the trim cover adjacent the air bag release seam, and the flexible inner and outer panels extending alongside each other from their outer extremities to the air bag module and thence respectively inwardly and outwardly thereof;
   a first connector for securing the inner extremity of the flexible inner panel to the frame;
   a second connector for securing the inner extremity of the flexible outer panel to the trim cover adjacent the air bag module at a spaced location from the first connector; and
   a connection for securing the trim cover to the frame.

2. A vehicle seat component as in claim 1 wherein the trim cover includes the same type of material extending over the seat pad and from the second connector to the inner extremity of the flexible outer panel to the connection to the frame.

3. A vehicle seat component as in claim 1 wherein the trim cover includes an extender of another type of material extending from adjacent the second connector to the inner extremity of the flexible outer panel to the connection to the frame.

4. A vehicle seat component as in claim 3 which includes stitching for securing the trim cover extender to the rest of the trim cover.

5. A vehicle seat component as in claim 1 wherein the second connector for securing the inner extremity of the flexible outer panel to the trim cover includes stitching.

6. A vehicle seat component as in claim 1 wherein the second connector for securing the inner extremity of the flexible outer panel to the trim cover comprises a bonded connection.

7. A vehicle seat component as in claim 6 wherein the bonded connection is selected from the group consisting of an adhesive connection, a heated connection, and a solvent connection.

8. A vehicle seat component as in claim 1 wherein the second connector for securing the inner extremity of the flexible outer panel to the trim cover includes stitching and also includes a bonded connection.

9. A vehicle seat back component comprising:
   a frame for mounting on an associated vehicle on which the vehicle seat back component is to be used, and the frame having a lateral side frame member;
   a seat pad mounted by the frame and having a side extremity adjacent the lateral side frame member of the frame;
   a trim cover extending over the seat pad and having an air bag release seam adjacent the side extremity of the seat pad;
   an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;
   an air bag guide including an inner panel and an outer panel that are each made of flexible material and have outer and inner extremities with their outer extremities connected to the trim cover adjacent the air bag release seam, and the flexible inner and outer panels extending alongside each other from their outer extremities to the air bag module and thence respectively inwardly and outwardly thereof;
   a first connector for securing the inner extremity of the flexible inner panel to the frame;
   a second connector selected from the group consisting of stitching and a bonded connection for securing the inner extremity of the flexible outer panel to the trim cover adjacent the air bag module at a spaced location from the first connector; and a connection for securing the trim cover to the frame.

10. A vehicle seat back component comprising:

a frame for mounting on an associated vehicle on which the vehicle seat back component is to be used, and the frame having a lateral side frame member;

a seat pad mounted by the frame and having a side extremity adjacent the lateral side frame member of the frame;

a trim cover extending over the seat pad and having an air bag release seam adjacent the side extremity of the seat pad;

an air bag module mounted on the lateral side frame member within the trim cover in a spaced relationship from its air bag release seam, and the air bag module including an inflator and an air bag that is inflated by the inflator to project outwardly from the seat component through the air bag release seam of the trim cover;

an air bag guide including an inner panel and an outer panel that are each made of flexible material and have outer and inner extremities with their outer extremities connected to the trim cover adjacent the air bag release seam, and the flexible inner and outer panels extending alongside each other from their outer extremities to the air bag module and thence respectively inwardly and outwardly thereof;

a first connector for securing the inner extremity of the flexible inner panel to the frame;

a second connector for securing the inner extremity of the flexible outer panel to the trim cover adjacent the air bag module at a spaced location from the first connector;

the trim cover including an extender of another type of material that extends from the trim cover adjacent its second connector to the inner extremity of the outer panel to the frame; and a connection for securing the extender of the trim cover to the frame.

* * * * *